Oct. 12, 1954
C. J. FORREST
2,691,337
PIE-MAKING UTENSIL
Filed June 26, 1952
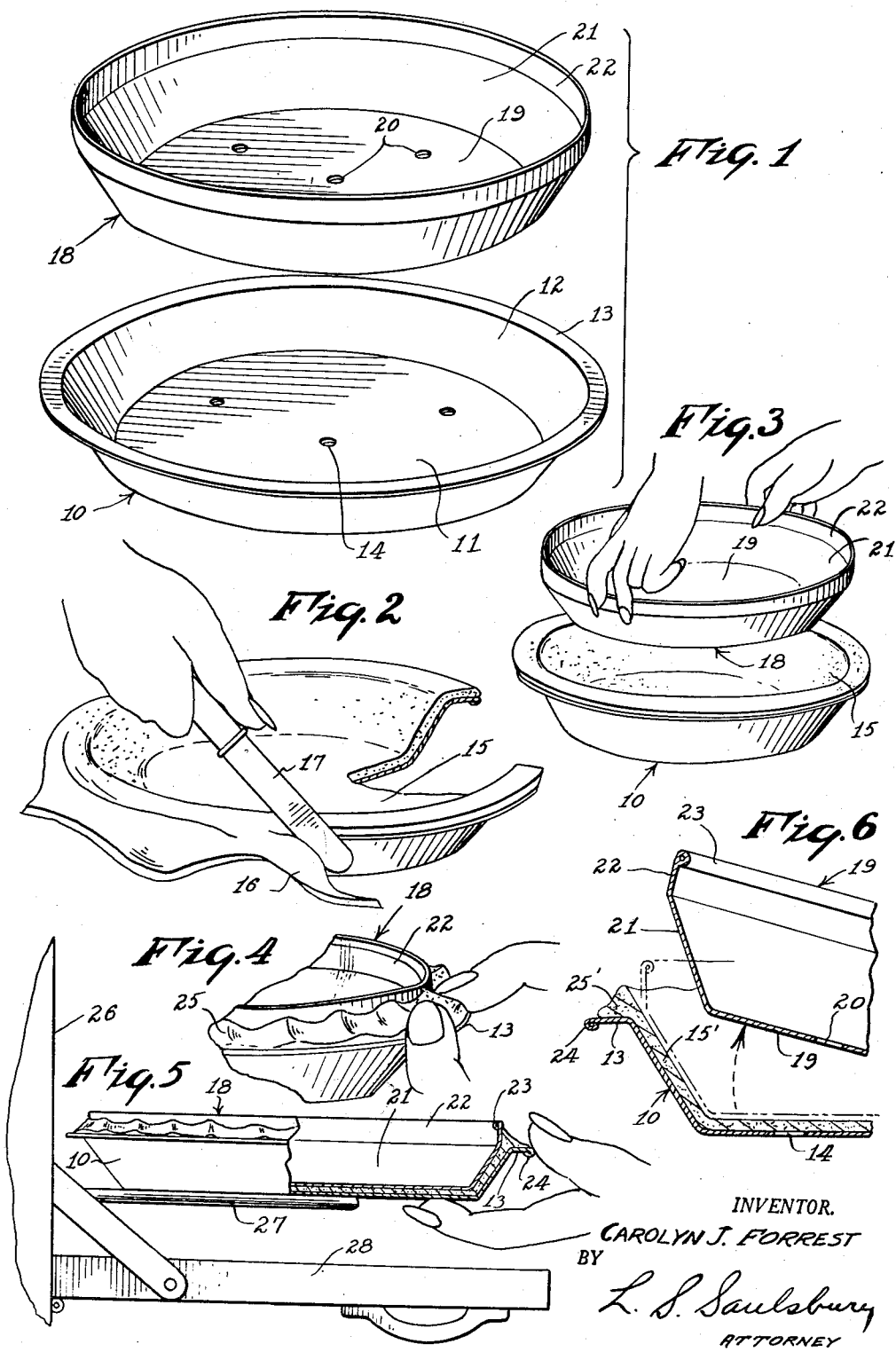
INVENTOR.
CAROLYN J. FORREST
BY
L. S. Saulsbury
ATTORNEY Patented Oct. 12, 1954

2,691,337

UNITED STATES PATENT OFFICE 2,691,337

PIE-MAKING UTENSIL

Carolyn J. Forrest, White Plains, N. Y.

Application June 26, 1952, Serial No. 295,747

2 Claims. (Cl. 99—433)

This invention relates to a pie shell forming device.

It is an object of the present invention to provide a device which could prevent the edge of a pie crust material from falling or shrinking away from the edge of the pie tin when being baked.

It is another object of the invention to provide a pie crust forming device adapted to be inserted in the pie tin which has a vertical flange that is relieved from the top pie edge and which provides a portion that can be easily gripped at times when the device is being inserted into the pie tin or removed therefrom and wherein this portion also serves as a backing when fluting the pie crust edge.

Other objects of the invention are to provide a pie crust forming member having the above objects in mind, which is of simple construction, inexpensive to manufacture, made of a single stamping operation and which may be molded, easy to use and clean, in one piece, of pleasing appearance and efficient in operation.

For a better understanding of the invention, reference may be had to the following detailed description taken in connection with the accompanying drawing, in which:

Figure 1 is a collective and perspective view of the combined pie crust forming member and pie tin;

Figure 2 is a perspective view of the pie tin with illustration made as to how the pie crust is formed in the pie tin in the usual manner;

Fig. 3 is a perspective view of the pie tin filled with dough and of the pie crust forming member in the process of being inserted therein;

Fig. 4 is a fragmentary perspective view of the combined tin and pie crust forming member with illustration being made as to how the upstanding portion of the forming member prevents the release of the pie crust edge while being pinched and fluted;

Fig. 5 is a side elevational view of the assembly with the pie crust material being inserted in an oven and a portion of the assembly broken away and shown in section;

Fig. 6 is an enlarged fragmentary sectional view of the assembly showing the baked pie crust and the pie crust forming member in the process of being lifted therefrom.

Referring now to the figures, 10 represents a pie tin having a bottom 11 and the usual upwardly and outwardly inclined side wall 12 with a horizontal flange 13. The bottom 11 has holes 14 through which moisture may escape and air may enter. The pie tin 10 is filled with pie crust dough 15 in the usual manner as shown in Figs. 2 and 3 with the excess pie crust dough 16 being severed from the outer edge of the flange 13 with a knife 17 in the usual manner.

Thereafter, a pie crust forming member 18 is inserted in the pie tin 10 over the pie crust 15 in the manner illustrated in Fig. 3. This pie crust forming member 18 has a bottom portion 19 with holes 20 therein for the same purpose as the holes 14 are provided in the pie tin 10. Extending upwardly and outwardly from the bottom 19, at the same angle as the side wall 12 of the pie tin, is an inclined wall 21 having an upstanding vertical flange 22. This flange 22 extends upwardly a distance about half the height of the side wall 21. This flange 22 may be rolled or rounded on its upper edge as indicated at 23, Fig. 6, so as to avoid sharp edges. In the same manner the pie tin flange 13 has a rolled edge 24.

Once the pie forming member 18 is in place within the soft pie crust material, the portion of the material resting on the flange 13 of the pie tin can be pinched and fluted to provide a pie crust rim body 25 to retain the pie filling and to make the pie attractive. At this time the upstanding flange 22 of the pie forming member 11 serves as a backing against which the pie crust material may be pressed.

With the pie crust material formed, the forming member 11 is inserted in an oven 26 where it is supported on a wire shelf 27. Thereafter the oven door 28 is lifted and closed. The pie crust is then baked and finally shaped.

By virtue of the use of this pie forming member 18 the pie shell edge cannot fall. When intense heat strikes the pie crust material, the shortening melts and the weight of the shortening has a tendency to carry the edge down so that the pie edge shrinks. By the use of the present pie crust forming device 18, this pie crust material is held up during the baking operation and the result is that a pie crust is formed in which the edge is not fallen. Since the pie crust edge is forced against the upstanding flange 22, it will have frictional engagement therewith and there is sufficient body or enlargement to hold it from shrinking into the space between the inclined walls 12 and 21 of the pie tin and the pie crust forming member 18. The holes in the pie tin bottom 11 and in the forming member bottom 19 will allow the moisture to evaporate and keep the pie crust from becoming soggy and will allow the air to circulate between the pie tin and the forming member.

The flange 22 extends substantially ninety degrees with respect to the top flange 13 of the pie tin 10. The side wall 21 of the pie crust forming device 18 extends at an angle of about sixty degrees from a plane taken through the forming device bottom 19.

The pie tin and the pie crust forming member can be made of metal, plastic, glass or any other suitable material. The pie crust edge will not have fallen because the inner pie crust forming member will have supported it.

While various changes may be made in the detail construction and in the method by which this process has been carried out, it shall be understood that such changes shall be within the spirit and scope of the present invention as defined by the appended claims.

What is claimed is:

1. A pie shell forming device comprising a pie tin having an upwardly and outwardly inclined side wall with a horizontal flange thereon and an inner pie crust forming member having an upwardly and outwardly inclined side wall conforming to the side wall of the pie tin and concentrically spaced therefrom when the pie dough is disposed therebetween and a vertically extending annular flange lying inwardly of the flange of the pie tin side wall and extending thereabove to form an annular backing against which an upstanding pie-crust edge is formed said annular vertically extending flange beginning at the elevation of the horizontal flange of the pie tin and extending upwardly therefrom.

2. A pie shell forming device as defined in claim 1 and said inner pie crust forming member having ventilating openings therein.

References Cited in the file of this patent

UNITED STATES PATENTS

| Number | Name | Date |
|---|---|---|
| 762,649 | McCullough | June 14, 1904 |
| 868,312 | Wilcox | Oct. 15, 1907 |
| 1,071,881 | Colborne | Sept. 2, 1913 |
| 1,411,128 | Strobhart | Mar. 28, 1922 |
| 1,527,671 | Condyles | Feb. 24, 1925 |
| 1,991,588 | Waterman | Feb. 19, 1935 |
| 2,237,697 | Brown | Apr. 8, 1941 |
| 2,297,914 | Pino | Oct. 6, 1942 |
| 2,570,060 | Johnson | Oct. 2, 1951 |
| 2,591,578 | McNealy et al. | Apr. 1, 1952 |